United States Patent
Steele, Jr. et al.

(10) Patent No.: US 10,157,346 B2
(45) Date of Patent: Dec. 18, 2018

(54) PARALLEL GIBBS SAMPLER USING BUTTERFLY-PATTERNED PARTIAL SUMS

(71) Applicant: Oracle International Corporation, Redwood Shores, CA (US)

(72) Inventors: Guy L. Steele, Jr., Lexington, MA (US); Jean-Baptiste Tristan, Lexington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 696 days.

(21) Appl. No.: 14/713,205

(22) Filed: May 15, 2015

(65) Prior Publication Data

US 2016/0224902 A1    Aug. 4, 2016

Related U.S. Application Data

(60) Provisional application No. 62/112,007, filed on Feb. 4, 2015.

(51) Int. Cl.
G06N 7/00    (2006.01)

(52) U.S. Cl.
CPC .................. G06N 7/005 (2013.01)

(58) Field of Classification Search
None
See application file for complete search history.

(56) References Cited

U.S. PATENT DOCUMENTS

| | | | |
|---|---|---|---|
| 8,484,245 B2 | 7/2013 | Ha-Thuc | |
| 9,767,416 B2* | 9/2017 | Tristan | G06N 7/005 |
| 2012/0095952 A1* | 4/2012 | Archambeau | G06K 9/6249 |
| | | | 706/52 |
| 2013/0159236 A1* | 6/2013 | Vladislav | G06F 17/2785 |
| | | | 706/46 |

(Continued)

OTHER PUBLICATIONS

Newman et al., "Distributed Algorithms for Topic Models", Journal of Machine Learning Research, dated 2009, 28 pages.

(Continued)

*Primary Examiner* — Paulinho E Smith
(74) *Attorney, Agent, or Firm* — Hickman Palermo Becker Bingham LLP

(57) ABSTRACT

An efficient parallel Gibbs sampler using butterfly-patterned partial sums is provided. Instead of building and searching a complete prefix sums table, an alternative "butterfly patterned partial sums table" is described that integrates a lightweight transposition and partial sums operation. Accordingly, the usual full matrix transposition and full prefix sums table building operations can be omitted in favor of building the butterfly-patterned partial sums table, which requires less computational and communication effort. This butterfly-patterned partial sums table is used by a modified binary search phase that calculates the needed prefix-sum table values on-the-fly using the butterfly-patterned partial sums table. Transposed memory access is also provided while avoiding the full matrix transform, providing significant performance benefits for highly parallel architectures, such as graphics processing units (GPUs) where 1-stride or sequential memory accesses are important for optimization.

24 Claims, 7 Drawing Sheets

(56) References Cited

U.S. PATENT DOCUMENTS

| | | | |
|---|---|---|---|
| 2014/0129510 A1* | 5/2014 | Vladislav | G06F 17/30011 706/52 |
| 2014/0149433 A1 | 5/2014 | Lakshminarayan | |
| 2014/0181214 A1* | 6/2014 | Price | G06F 9/5066 709/205 |
| 2015/0095277 A1 | 4/2015 | Tristan et al. | |
| 2015/0268930 A1* | 9/2015 | Lee | G06F 17/30731 707/754 |
| 2016/0210718 A1 | 7/2016 | Tristan et al. | |
| 2016/0224544 A1 | 8/2016 | Tristan et al. | |
| 2016/0224900 A1* | 8/2016 | Steele, Jr. | G06F 9/5066 |
| 2016/0350411 A1 | 12/2016 | Tristan | |
| 2017/0039265 A1 | 2/2017 | Steele, Jr. | |
| 2017/0154077 A1* | 6/2017 | Kang | G06F 7/20 |

OTHER PUBLICATIONS

Blei et al., "Latent Dirichlet Allocation" Journal of Machine Learning Research 3, dated 2003, 30 pages.
Celeux et al., "On Stochastic Versions of the EM Algorithm", INRIA, dated Mar. 1995, 25 pages.
Chang et al., "Reading Tea Leaves: How Humans Interpret Topic Models" dated 2009, 9 pages.
Freitas et al., "Bayesian Latent Semantic Analysis of Multimedia Databases" Technical Report, dated Oct. 22, 2001, 36 pages.
Griffiths et al., "Finding Scientific Topics" Colloquium, PNAS, vol. 101, dated Apr. 6, 2004, 8 pages.
Jiang et al., "A Method of Accelerating LDA Program with GPU", 2012 Third International Conference on Networking and Distributed Computing IEEE, 2012, 4 pages.
Asuncion et al., "On Smoothing and Inference for Topic Models", UAI 2009, 8 pages.
Lu et al., "Accelerating Topic Training on a Single Machine", APWeb dated 2013, 12 pages.
Yao et al., "Efficient Methods for Topic Model Inference on Streaming Document Collections", KDD, dated 2009, ACM, 9 pages.
Porteous et al., "Fast Collapsed Gibbs Sampling for Latent Dirichlet Allocation" KDD dated 2008, ACM, 9 pages.
Smola et al., "An Architecture for Parallel Topic Models" Proceedings of the VLDB Endowment, vol. 3, No. 1, dated 2010, 8 pages.
Wallach et al., "Evaluation Methods for Topic Models" Proceedings of 26th International Conference on Machine Learning Monteral, Canada, dated 2009, 8 pages.
Wallach et al., "Rethinking LDA: Why Priors Matter" dated 2009, 9 pages.
Wang et al., "PLDA: Parallel Latent Dirichlet Allocation for Large-Scale Applications" AAIM, dated 2009, 14 pages.
Yan et al., "Parallel Inference for Latent Dirichlet Allocation on Graphics Processing Units" dated 2009, 9 pages.
Liu et al., "PLDA+:Parallel Latent Dirichlet Allocation with Data Placement and Pipeline Processing", ACM, dated 2011, 18 pages.
Tristan, U.S. Appl. No. 14/316,186, filed Jun. 26, 2014, Final Office Action, dated May 11, 2017.
Tristan, U.S. Appl. No. 14/599,272, filed Jan. 16, 2015, Office Action, dated Sep. 25, 2017.
Tristan, U.S. Appl. No. 14/316,186, filed May 26, 2014, Advisory Action, dated Aug. 3, 2017.
U.S. Appl. No. 14/755,312, filed Jun. 30, 2015, Office Action, dated Oct. 3, 2016.
Tristan, U.S. Appl. No. 14/599,272, filed Jan. 16, 2015, Final Office Action, dated Nov. 15, 2017.
Rosen-Zvi et al., "Learning Author-Topic Models from Text Corpora", 2004 Uncertainty in AI Conference and the 2004 ACM SIGKDD Conference, dated 2010, AMC, 38 pages.
Tristan, U.S. Appl. No. 14/599,272, filed Jan. 16, 2015, Advisory Action, dated Jan. 24, 2018.
Steele Jr, U.S. Appl. No. 14/821,511, filed Aug. 7, 2015, Office Action, dated Feb. 9, 2018.
Steele Jr, U.S. Appl. No. 14/820,169, filed Aug. 6, 2015, Office Action, dated Feb. 27, 2018.
Steele Jr., U.S. Appl. No. 14/821,511, filed Aug. 7, 2015, Interview Summary, dated May 11, 2018.
Brown, U.S. Appl. No. 15/074,248, filed Mar. 18, 2016, Notice of Allowance, dated Apr. 24, 2018.
Zhao, Huasha, Jiang, Biye, and Canny, John. "SAME But Different: Fast and High-quality Gibbs Parameter Estimation". CoRR, abs/1409.5402, 2014, 10 pages.
Thomas, Andrew, "BUGS A Programto Perform Bayesian Inference Using Gibbs Sampling", Oxford University Press dated 1992, 4 pages.
Marsaglia, George, "A Simple Method for Generating Gamma Variables", ACM Transactions on Mathematical Software, vol. 26, No. dated Sep. 3, 2000, 10 pages.
Steele, Jr., U.S. Appl. No. 14/820,169, filed Aug. 6, 2015, Notice of Allowance, dated Jul. 23, 2018.
Steele Jr., U.S. Appl. No. 14/821,511, filed Aug. 7, 2015, Notice of Allowance dated Aug. 6, 2018.

* cited by examiner

PARALLEL GIBBS SAMPLER USING BUTTERFLY-PATTERNED PARTIAL SUMS

CROSS-REFERENCE TO RELATED APPLICATIONS; BENEFIT CLAIM

This application claims the benefit of U.S. Provisional Application No. 62/112,007, filed Feb. 4, 2015, which is hereby incorporated by reference in its entirety. This application is related to "Data-Parallel Probabilistic Inference", U.S. patent application Ser. No. 14/316,186 filed Jun. 26, 2014; "Data-Parallel Parameter Estimation of the Latent Dirichlet Allocation Model by Greedy Gibbs Sampling", U.S. patent application Ser. No. 14/599,272 filed Jan. 16, 2015; the entire contents of these patents are hereby incorporated by reference as if fully set forth herein.

FIELD OF THE INVENTION

The present disclosure relates to machine learning, and more specifically, to a parallel Gibbs sampler using butterfly-patterned partial sums.

BACKGROUND

In machine learning applications such as natural language processing, it is often beneficial to automatically discover topics in a corpus of documents, a technique known as topic modeling. Since the topics associated with each document in the corpus are unknown parameters or latent variables that cannot be directly sampled, some means of statistical inference is needed to approximate the topics for each document in the corpus.

One such means of statistical inference is a collapsed Gibbs sampler on a statistical model called Latent Dirichlet Allocation (LDA). However, the collapsed Gibbs sampler has the drawback of being an inherently sequential algorithm. Thus, the collapsed Gibbs sampler does not scale well for topic modeling on a large corpus, such as for enterprise databases, search engines, and other data intensive high performance computing (HPC) applications.

U.S. patent application Ser. No. 14/599,272 describes a non-collapsed or partially collapsed Gibbs sampler. Thus, rather than using a sequential collapsed Gibbs sampler, a non-collapsed or partially collapsed Gibbs sampler can be utilized to provide a scalable, parallel implementation on a highly parallel architecture such as a graphics processing unit (GPU) or another single instruction, multiple data (SIMD) architecture. The parallel LDA Gibbs sampler may be supported as one suitable algorithm for a data-parallel probabilistic programming compiler, as described in U.S. patent application Ser. No. 14/316,186.

In one phase of the LDA Gibbs sampler, new z values are randomly drawn from an appropriate discrete probability distribution. Conceptually, the phase may be considered a multi-step process of: 1) fetching parameters from main memory to create a table of relative probabilities for possible choices of the z value, 2) constructing a sum-prefix table from the table of relative probabilities, and 3) searching the sum-prefix table, for example by binary search to randomly draw the z value. When implementing this phase on a parallel architecture, a straightforward approach is to compute each z value for each discrete probability distribution in a separate thread. However, this approach presents challenges with regards to memory fetch performance. For example, if each thread merely retrieves its respective parameters in successive read cycles, then the memory accesses will tend to be scattered in different physical memory locations. Even if a cache is available, the cache will be unable to coalesce the reads from disparate memory locations.

To optimize memory locality, the read cycles may be organized such that all threads cooperate on each read cycle to read the needed parameters for one specific thread. In other words, access to the parameters is organized in transposed form, allowing the parameters to be read from contiguous memory locations. However, because each thread reads parameters that are needed by other threads, an exchange of information is necessary to finish computing the z values for each thread. For some parallel hardware architectures such as GPUs, this information exchange may require a complete matrix transposition on the fetched parameters, and then a computation of all prefix sums to fill the prefix-sum table. Unfortunately, this processing may undermine the memory fetch performance gains from using transposed access in the first instance.

Based on the foregoing, there is a need for a high performance Gibbs sampler that is suited for highly parallel architectures such as GPUs and other SIMD architectures.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a parallel Gibbs sampler using butterfly-patterned partial sums is provided. As discussed above, drawing z values for the Gibbs sampler conceptually uses a three step process, wherein the final step is a binary search on a previously built prefix sums table. However, by observing that the binary search on the prefix sums table only needs to access a small number of prefix sums in the table, or about $\log_2 N$ entries for a table of N entries, an alternative table can be built that integrates a lightweight transposition and partial sums operation. Accordingly, the usual full matrix transposition and full prefix sums table building operations can be omitted in favor of building the alternative table, or a butterfly-patterned partial sums table, which requires less computational and communication effort. This butterfly-patterned partial sums table is used by a modified binary search phase that calculates the needed prefix-sum table values on-the-fly using the butterfly-patterned partial sums table.

While the modified binary search phase requires more computational work than a straightforward binary search on a full prefix sums table, this additional work is more than offset by avoiding the computationally expensive operations of a full matrix transform and building a full prefix sums table. Additionally, transposed memory access is facilitated by avoiding these operations, providing significant performance benefits for highly parallel architectures such as GPUs where 1-stride or sequential memory accesses are important for optimization. Accordingly, the parallel Gibbs sampler using butterfly-patterned partial sums can provide highly efficient performance scaling with particular application for machine learning applications, including topic modeling, and other large scale statistical analysis tasks.

System Overview

Figure 1A:
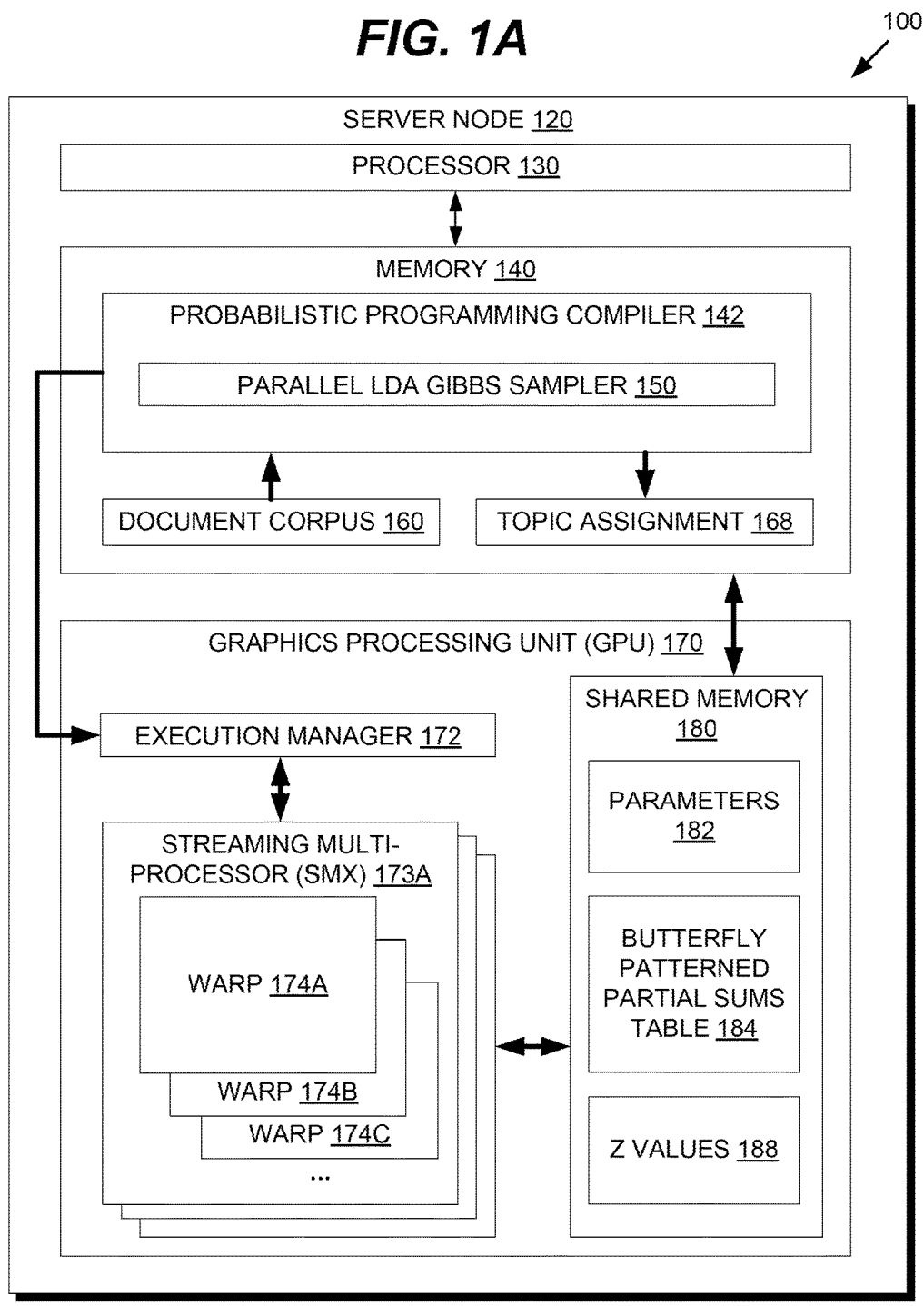
FIG. 1A is a block diagram that depicts an example system for a parallel Gibbs sampler using butterfly patterned partial sums.

FIG. 1A is a block diagram that depicts an example system for a parallel Gibbs sampler using butterfly patterned partial sums. System 100 of FIG. 1A includes server 120. Server 120 includes processor 130, memory 140, and graphics processing unit (GPU) 170. Memory 140 includes probabilistic programming compiler 142, document corpus 160, and topic assignment 168. Probabilistic programming compiler 142 includes parallel LDA Gibbs sampler 150. GPU 170 includes execution manager 172, streaming multiprocessor (SMX) 173A, and shared memory 180. Streaming multiprocessor (SMX) 173 includes warp 174A, warp 174B, and warp 174C. Shared memory 180 includes parameters 182, butterfly patterned partial sums table 184, and Z values 188.

As shown in FIG. 1A, server 120 may include a general purpose processor 130, which may correspond to one or more multi-core processors. However, these general purpose processors only include a limited number of cores, for example 1-8 cores. Accordingly, server 120 also includes GPU 170, which may include several SMX units, for example 15 or more, with each SMX unit, such as SMX 173A, including many cores, for example 192 or more. These cores are tuned for highly parallel stream processing with the ability to quickly change execution contexts to support a much larger number of threads. Thus, each SMX unit may support a large number of threads, for example 2048 or more, that are divided into execution groups called warps, such as warps 174A-174C as shown. While only three (3) warps are illustrated in SMX 173A, it should be noted that SMX 173A may include many more warps, for example 64 or more. Execution manager 172 may be utilized to manage and schedule code kernels for the SMX units. Further, while a graphics processing unit is specifically illustrated in the embodiment shown in FIG. 1A, any suitable SIMD based parallel architecture may also be utilized.

Probabilistic programming compiler 142, as described in U.S. patent application Ser. No. 14/316,186, may include several highly parallel algorithms, including parallel LDA Gibbs sampler 150, to solve probabilistic problems. For example, one problem may require the topic modeling of document corpus 160 to determine topic assignment 168. Probabilistic programming compiler 142 may determine that parallel LDA Gibbs sampler 150 is the most appropriate algorithm to solve this problem. Parallel LDA Gibbs sampler 150 may then utilize GPU 170 to perform Gibbs sampling in a highly parallel fashion.

Parallel Gibbs Sampling Process

Figure 2:
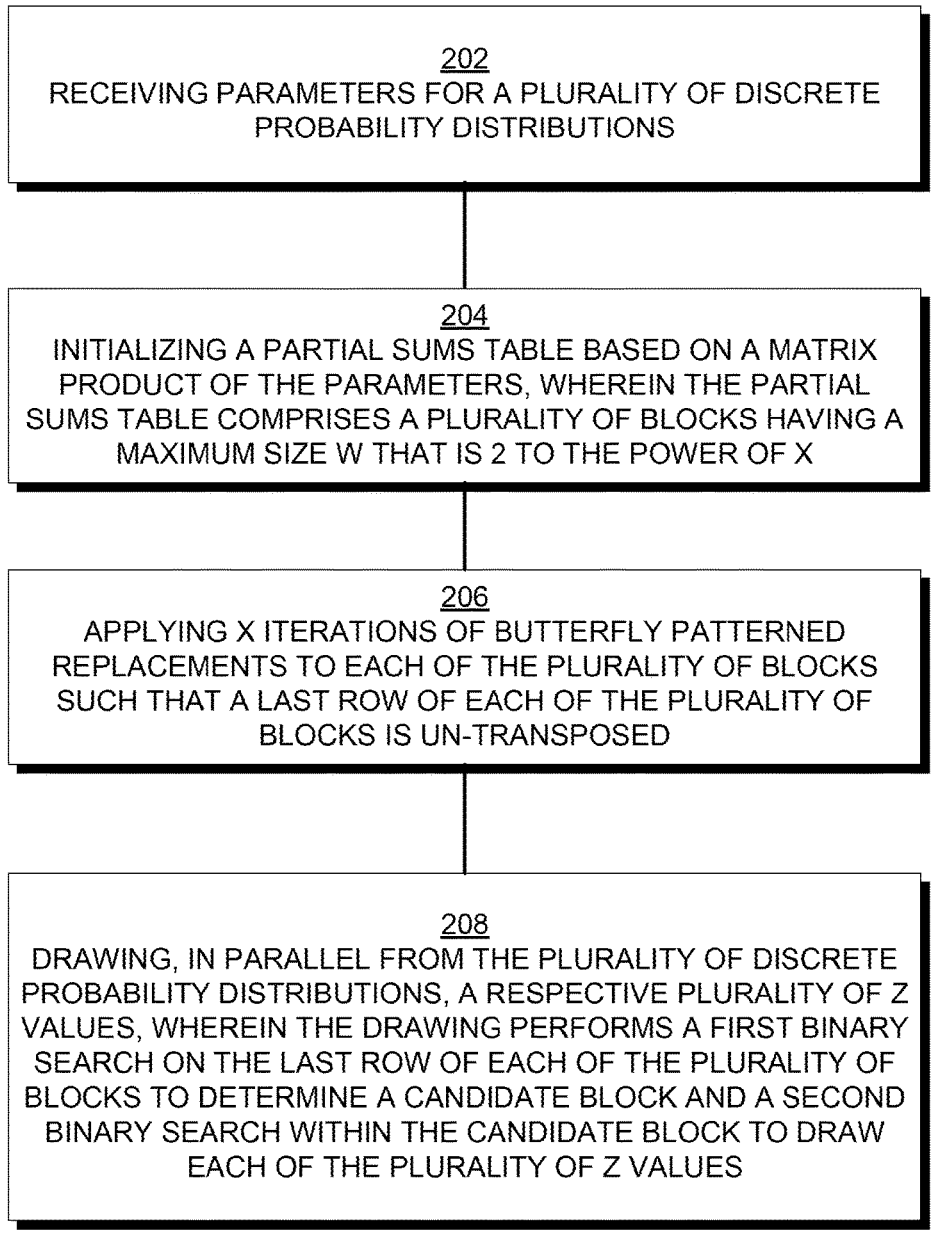
FIG. 2 is a block diagram that depicts a process for utilizing a parallel Gibbs sampler using butterfly patterned partial sums, according to an embodiment.

With a basic outline of system 100 now in place, it may be instructive to review a high level overview of the processing steps to utilize a parallel Gibbs sampler using butterfly patterned partial sums. Turning to FIG. 2, FIG. 2 is a block diagram that depicts a process for utilizing a parallel Gibbs sampler using butterfly patterned partial sums, according to an embodiment.

Receiving the Parameters

At block 202 of process 200, referring to FIG. 1A, GPU 170 receives parameters 182. For example, probabilistic programming compiler 142 may use direct memory access (DMA) to transfer parameters 182 from memory 140 into shared memory 180 of GPU 170. In the specific example shown in FIG. 1A, parameters 182 correspond to discrete probability distributions of each document in document corpus 160. However, in alternative embodiments, parameters 182 may correspond to discrete probability distributions for any kind of data. Parameters 182 may further be received in transposed form for local instantiation and caching (e.g. in local cache or registers) by individual threads or warps of GPU 170, as discussed below under "optimizing memory access".

Assuming that document corpus 160 includes "M" number of documents, "K" number of topics, and a "V" sized vocabulary or set of distinct words, then parameters 182 may include a two-dimensional M×K matrix "θ" (theta matrix) and a two-dimensional V×K matrix "φ" (phi matrix). The θ and φ matrices (or multi-dimensional arrays) may use floating point data types. Additionally, assuming that parameters 182 further includes a scalar array "N" of length M that provides the length (number of words) of each document in document corpus 160, then an M×N ragged array "w" may correspond to the words (represented by values within V) of each document in document corpus 160, wherein the array "w" is ragged due to the varying lengths of each document. In some embodiments, the array "w" may be padded so that the array "w" is uniformly sized rather than ragged.

Initializing a Butterfly Patterned Partial Sums Table

At block 204 of process 200, referring to FIG. 1A, GPU 170 initializes butterfly patterned partial sums table 184 based on a matrix product of parameters 182. Butterfly patterned partial sums table 184 comprises a plurality of blocks having a maximum size W or number of rows "W" that is 2 to a power of X, or 2^X. "W" is a constant that depends on the particulars of the hardware architecture being utilized.

For example, to optimize performance on GPU 170, it may be ideal to have threads in the same warp execute the same code path and access sequential memory addresses. Thus, for GPU 170, the maximum size "W" is set according to the maximum number of threads in a warp. For example, if GPU 170 corresponds to a modern GPU architecture such as the NVIDIA KEPLER series, then each warp 174A-174C may run W=2^5 or 32 threads (X=5). However, to provide a simplified example, it may be assumed that each warp 174A-174C only runs W=2^3 or 8 threads (X=3). Once "W" is determined, "M" should be padded out with empty documents such that "M" is a multiple of "W". In this manner, each warp can be guaranteed a fully threaded workload for simplicity of implementation.

Optimizing Memory Access

Before discussing the initializing of butterfly patterned partial sums table 184, it may be helpful to first discuss the performance problems associated with optimizing access to parameters 182. In various embodiments, parameters 182 may be read from shared memory 180 or directly from memory 140 without an intermediate copying to shared memory 180. Assuming "M"=8, "K"=19, and "W"=8 as discussed above, a local array $\theta_{local}$, sized K, may be instantiated and cached locally for each thread (threads #0 to #7) in a warp, as shown in Table 1 below (note that all arrays use the convention of starting from index 0):

TABLE 1

Example non-transposed contents of $\theta_{local}$[K] for each thread in a warp.

| thread 0 | thread 1 | thread 2 | thread 3 | thread 4 | thread 5 | thread 6 | thread 7 |
|---|---|---|---|---|---|---|---|
| θ[0, 0] | θ[1, 0] | θ[2, 0] | θ[3, 0] | θ[4, 0] | θ[5, 0] | θ[6, 0] | θ[7, 0] |
| θ[0, 1] | θ[1, 1] | θ[2, 1] | θ[3, 1] | θ[4, 1] | θ[5, 1] | θ[6, 1] | θ[7, 1] |
| θ[0, 2] | θ[1, 2] | θ[2, 2] | θ[3, 2] | θ[4, 2] | θ[5, 2] | θ[6, 2] | θ[7, 2] |
| θ[0, 3] | θ[1, 3] | θ[2, 3] | θ[3, 3] | θ[4, 3] | θ[5, 3] | θ[6, 3] | θ[7, 3] |
| θ[0, 4] | θ[1, 4] | θ[2, 4] | θ[3, 4] | θ[4, 4] | θ[5, 4] | θ[6, 4] | θ[7, 4] |
| θ[0, 5] | θ[1, 5] | θ[2, 5] | θ[3, 5] | θ[4, 5] | θ[5, 5] | θ[6, 5] | θ[7, 5] |
| θ[0, 6] | θ[1, 6] | θ[2, 6] | θ[3, 6] | θ[4, 6] | θ[5, 6] | θ[6, 6] | θ[7, 6] |
| θ[0, 7] | θ[1, 7] | θ[2, 7] | θ[3, 7] | θ[4, 7] | θ[5, 7] | θ[6, 7] | θ[7, 7] |
| θ[0, 8] | θ[1, 8] | θ[2, 8] | θ[3, 8] | θ[4, 8] | θ[5, 8] | θ[6, 8] | θ[7, 8] |
| θ[0, 9] | θ[1, 9] | θ[2, 9] | θ[3, 9] | θ[4, 9] | θ[5, 9] | θ[6, 9] | θ[7, 9] |
| θ[0, 10] | θ[1, 10] | θ[2, 10] | θ[3, 10] | θ[4, 10] | θ[5, 10] | θ[6, 10] | θ[7, 10] |
| θ[0, 11] | θ[1, 11] | θ[2, 11] | θ[3, 11] | θ[4, 11] | θ[5, 11] | θ[6, 11] | θ[7, 11] |
| θ[0, 12] | θ[1, 12] | θ[2, 12] | θ[3, 12] | θ[4, 12] | θ[5, 12] | θ[6, 12] | θ[7, 12] |
| θ[0, 13] | θ[1, 13] | θ[2, 13] | θ[3, 13] | θ[4, 13] | θ[5, 13] | θ[6, 13] | θ[7, 13] |
| θ[0, 14] | θ[1, 14] | θ[2, 14] | θ[3, 14] | θ[4, 14] | θ[5, 14] | θ[6, 14] | θ[7, 14] |
| θ[0, 15] | θ[1, 15] | θ[2, 15] | θ[3, 15] | θ[4, 15] | θ[5, 15] | θ[6, 15] | θ[7, 15] |
| θ[0, 16] | θ[1, 16] | θ[2, 16] | θ[3, 16] | θ[4, 16] | θ[5, 16] | θ[6, 16] | θ[7, 16] |
| θ[0, 17] | θ[1, 17] | θ[2, 17] | θ[3, 17] | θ[4, 17] | θ[5, 17] | θ[6, 17] | θ[7, 17] |
| θ[0, 18] | θ[1, 18] | θ[2, 18] | θ[3, 18] | θ[4, 18] | θ[5, 18] | θ[6, 18] | θ[7, 18] |

As shown in Table 1, the 19 entries (documents) are divided into 3 blocks with a maximum size of 8 entries. Since Table 1 is non-transposed, each thread already has all of the θ values necessary for that particular thread to proceed, facilitating optimized register use for storing and manipulating the θ values. However, the memory fetch performance is poor, since the θ values will be accessed from scattered memory locations for each thread in a read cycle of the associated kernel, or the code executed by each of the threads in a warp.

Note that unless K is an exact multiple of W, there will be a block that has less than the maximum size of 8 entries. In Table 1, this is the first block with 3 entries, referred to herein as the "remnant". Since the remnant has less than W entries, it requires some special handling in the kernel. In an embodiment, the remnant may be processed by a sequential search to draw a z value for z values 188, as the typically small size of the remnant enables the sequential search to be competitive to a binary search in execution time. While it is possible to have this remnant at the end of the table, loop control is facilitated if the "remnant" is placed at the top of the table, as shown above. If K is an exact multiple of W, then the "remnant" can be sized 0 or empty.

To facilitate sequential memory access, parameters 182, including the "θ", "φ", and "w" arrays, may be accessed in transposed fashion in block 202. Transposed copies of local array $\theta_{local}$ for each thread in a warp may appear as follows:

TABLE 2

Example transposed contents of $\theta_{local}[K]$ for each thread in a warp.

| thread 0 | thread 1 | thread 2 | thread 3 | thread 4 | thread 5 | thread 6 | thread 7 |
|---|---|---|---|---|---|---|---|
| θ[0, 0] | θ[1, 0] | θ[2, 0] | θ[3, 0] | θ[4, 0] | θ[5, 0] | θ[6, 0] | θ[7, 0] |
| θ[0, 1] | θ[1, 1] | θ[2, 1] | θ[3, 1] | θ[4, 1] | θ[5, 1] | θ[6, 1] | θ[7, 1] |
| θ[0, 2] | θ[1, 2] | θ[2, 2] | θ[3, 2] | θ[4, 2] | θ[5, 2] | θ[6, 2] | θ[7, 2] |
| θ[0, 3] | θ[0, 4] | θ[0, 5] | θ[0, 6] | θ[0, 7] | θ[0, 8] | θ[0, 9] | θ[0, 10] |
| θ[1, 3] | θ[1, 4] | θ[1, 5] | θ[1, 6] | θ[1, 7] | θ[1, 8] | θ[1, 9] | θ[1, 10] |
| θ[2, 3] | θ[2, 4] | θ[2, 5] | θ[2, 6] | θ[2, 7] | θ[2, 8] | θ[2, 9] | θ[2, 10] |
| θ[3, 3] | θ[3, 4] | θ[3, 5] | θ[3, 6] | θ[3, 7] | θ[3, 8] | θ[3, 9] | θ[3, 10] |
| θ[4, 3] | θ[4, 4] | θ[4, 5] | θ[4, 6] | θ[4, 7] | θ[4, 8] | θ[4, 9] | θ[4, 10] |
| θ[5, 3] | θ[5, 4] | θ[5, 5] | θ[5, 6] | θ[5, 7] | θ[5, 8] | θ[5, 9] | θ[5, 10] |
| θ[6, 3] | θ[6, 4] | θ[6, 5] | θ[6, 6] | θ[6, 7] | θ[6, 8] | θ[6, 9] | θ[6, 10] |
| θ[7, 3] | θ[7, 4] | θ[7, 5] | θ[7, 6] | θ[7, 7] | θ[7, 8] | θ[7, 9] | θ[7, 10] |
| θ[0, 11] | θ[0, 12] | θ[0, 13] | θ[0, 14] | θ[0, 15] | θ[0, 16] | θ[0, 17] | θ[0, 18] |
| θ[1, 11] | θ[1, 12] | θ[1, 13] | θ[1, 14] | θ[1, 15] | θ[1, 16] | θ[1, 17] | θ[1, 18] |
| θ[2, 11] | θ[2, 12] | θ[2, 13] | θ[2, 14] | θ[2, 15] | θ[2, 16] | θ[2, 17] | θ[2, 18] |
| θ[3, 11] | θ[3, 12] | θ[3, 13] | θ[3, 14] | θ[3, 15] | θ[3, 16] | θ[3, 17] | θ[3, 18] |
| θ[4, 11] | θ[4, 12] | θ[4, 13] | θ[4, 14] | θ[4, 15] | θ[4, 16] | θ[4, 17] | θ[4, 18] |
| θ[5, 11] | θ[5, 12] | θ[5, 13] | θ[5, 14] | θ[5, 15] | θ[5, 16] | θ[5, 17] | θ[5, 18] |
| θ[6, 11] | θ[6, 12] | θ[6, 13] | θ[6, 14] | θ[6, 15] | θ[6, 16] | θ[6, 17] | θ[6, 18] |
| θ[7, 11] | θ[7, 12] | θ[7, 13] | θ[7, 14] | θ[7, 15] | θ[7, 16] | θ[7, 17] | θ[7, 18] |

As shown in Table 2, the remnant is left as-is, but the access to θ from parameters 182 is in transposed form for all other fully populated blocks. While this provides optimized memory access, as discussed above, the threads still need to work together to finish calculating the sum-prefix table. As part of this process, a local array "a" sized M×W, or the θ×φ products, needs to be calculated for each block. After "a" is available, "p", or an M×K sized local array of partial sums of the θ×φ products, must also be calculated as well.

To calculate the arrays "a" and "p", a special notation is introduced for convenience:

Special notation for building a partial sums table. Formula 1

$$\sum_{m}^{i}[p:q] = \sum_{k=p}^{q}\theta[m,k] \times \phi[w[m][i],k]$$

Based on this notation, the array "p" as described above may appear as follows:

Thus, when processing the i'th word of each document, which may occur in parallel and in SIMD fashion, each cell in Table 3 is filled according to:

$$p[m,k] = \Sigma_m^i[0:k]$$

wherein the first index of p (m) indicates a column and the second index of p (k) indicates a row.

However, because calculation of "p" accesses the "a" array (the θ×φ products) in transposed form, "a" must be read from memory rather than from registers, reducing performance. While a full W×W matrix transform can be applied to convert the "a" array to un-transposed form to facilitate register usage in a warp, this operation is expensive and preferably avoided.

Figure 1B:
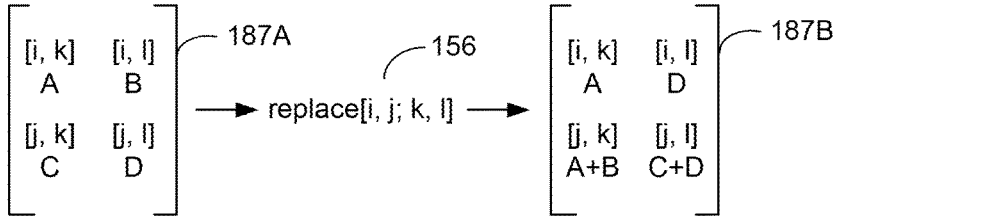
FIG. 1B is a block diagram that summarizes the creation of a butterfly patterned partial sums table, according to an embodiment.
Figure 1B:
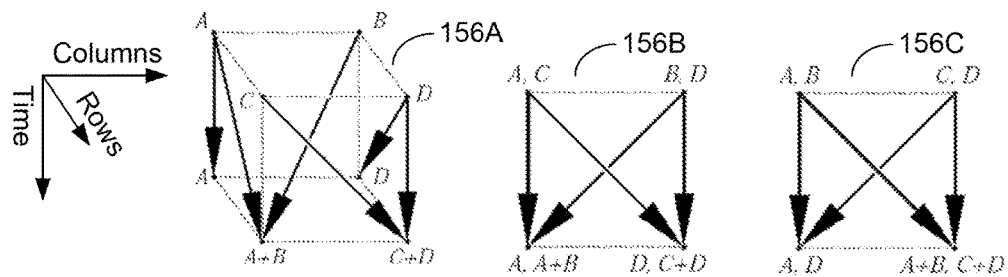

With the goal of solving the performance problems encountered when attempting to optimize Gibbs sampling for highly parallel architectures, a novel butterfly patterned partial sums table 184 is proposed to enable parallel Gibbs sampling in an efficient manner. Referring to FIG. 1B, FIG. 1B is a block diagram that summarizes the creation of a butterfly patterned partial sums table, according to an embodiment. FIG. 1B includes butterfly patterned partial sums table 184A, butterfly patterned replacements 152,

TABLE 3

Example contents of a "p" array, or the partial sums of the θ × φ products.

| $\Sigma_0^i[0:0]$ | $\Sigma_1^i[0:0]$ | $\Sigma_2^i[0:0]$ | $\Sigma_3^i[0:0]$ | $\Sigma_4^i[0:0]$ | $\Sigma_5^i[0:0]$ | $\Sigma_6^i[0:0]$ | $\Sigma_7^i[0:0]$ |
| $\Sigma_0^i[0:1]$ | $\Sigma_1^i[0:1]$ | $\Sigma_2^i[0:1]$ | $\Sigma_3^i[0:1]$ | $\Sigma_4^i[0:1]$ | $\Sigma_5^i[0:1]$ | $\Sigma_6^i[0:1]$ | $\Sigma_7^i[0:1]$ |
| $\Sigma_0^i[0:2]$ | $\Sigma_1^i[0:2]$ | $\Sigma_2^i[0:2]$ | $\Sigma_3^i[0:2]$ | $\Sigma_4^i[0:2]$ | $\Sigma_5^i[0:2]$ | $\Sigma_6^i[0:2]$ | $\Sigma_7^i[0:2]$ |
| $\Sigma_0^i[0:3]$ | $\Sigma_1^i[0:3]$ | $\Sigma_2^i[0:3]$ | $\Sigma_3^i[0:3]$ | $\Sigma_4^i[0:3]$ | $\Sigma_5^i[0:3]$ | $\Sigma_6^i[0:3]$ | $\Sigma_7^i[0:3]$ |
| $\Sigma_0^i[0:4]$ | $\Sigma_1^i[0:4]$ | $\Sigma_2^i[0:4]$ | $\Sigma_3^i[0:4]$ | $\Sigma_4^i[0:4]$ | $\Sigma_5^i[0:4]$ | $\Sigma_6^i[0:4]$ | $\Sigma_7^i[0:4]$ |
| $\Sigma_0^i[0:5]$ | $\Sigma_1^i[0:5]$ | $\Sigma_2^i[0:5]$ | $\Sigma_3^i[0:5]$ | $\Sigma_4^i[0:5]$ | $\Sigma_5^i[0:5]$ | $\Sigma_6^i[0:5]$ | $\Sigma_7^i[0:5]$ |
| $\Sigma_0^i[0:6]$ | $\Sigma_1^i[0:6]$ | $\Sigma_2^i[0:6]$ | $\Sigma_3^i[0:6]$ | $\Sigma_4^i[0:6]$ | $\Sigma_5^i[0:6]$ | $\Sigma_6^i[0:6]$ | $\Sigma_7^i[0:6]$ |
| $\Sigma_0^i[0:7]$ | $\Sigma_1^i[0:7]$ | $\Sigma_2^i[0:7]$ | $\Sigma_3^i[0:7]$ | $\Sigma_4^i[0:7]$ | $\Sigma_5^i[0:7]$ | $\Sigma_6^i[0:7]$ | $\Sigma_7^i[0:7]$ |
| $\Sigma_0^i[0:8]$ | $\Sigma_1^i[0:8]$ | $\Sigma_2^i[0:8]$ | $\Sigma_3^i[0:8]$ | $\Sigma_4^i[0:8]$ | $\Sigma_5^i[0:8]$ | $\Sigma_6^i[0:8]$ | $\Sigma_7^i[0:8]$ |
| $\Sigma_0^i[0:9]$ | $\Sigma_1^i[0:9]$ | $\Sigma_2^i[0:9]$ | $\Sigma_3^i[0:9]$ | $\Sigma_4^i[0:9]$ | $\Sigma_5^i[0:9]$ | $\Sigma_6^i[0:9]$ | $\Sigma_7^i[0:9]$ |
| $\Sigma_0^i[0:10]$ | $\Sigma_1^i[0:10]$ | $\Sigma_2^i[0:10]$ | $\Sigma_3^i[0:10]$ | $\Sigma_4^i[0:10]$ | $\Sigma_5^i[0:10]$ | $\Sigma_6^i[0:10]$ | $\Sigma_7^i[0:10]$ |
| $\Sigma_0^i[0:11]$ | $\Sigma_1^i[0:11]$ | $\Sigma_2^i[0:11]$ | $\Sigma_3^i[0:11]$ | $\Sigma_4^i[0:11]$ | $\Sigma_5^i[0:11]$ | $\Sigma_6^i[0:11]$ | $\Sigma_7^i[0:11]$ |
| $\Sigma_0^i[0:12]$ | $\Sigma_1^i[0:12]$ | $\Sigma_2^i[0:12]$ | $\Sigma_3^i[0:12]$ | $\Sigma_4^i[0:12]$ | $\Sigma_5^i[0:12]$ | $\Sigma_6^i[0:12]$ | $\Sigma_7^i[0:12]$ |
| $\Sigma_0^i[0:13]$ | $\Sigma_1^i[0:13]$ | $\Sigma_2^i[0:13]$ | $\Sigma_3^i[0:13]$ | $\Sigma_4^i[0:13]$ | $\Sigma_5^i[0:13]$ | $\Sigma_6^i[0:13]$ | $\Sigma_7^i[0:13]$ |
| $\Sigma_0^i[0:14]$ | $\Sigma_1^i[0:14]$ | $\Sigma_2^i[0:14]$ | $\Sigma_3^i[0:14]$ | $\Sigma_4^i[0:14]$ | $\Sigma_5^i[0:14]$ | $\Sigma_6^i[0:14]$ | $\Sigma_7^i[0:14]$ |
| $\Sigma_0^i[0:15]$ | $\Sigma_1^i[0:15]$ | $\Sigma_2^i[0:15]$ | $\Sigma_3^i[0:15]$ | $\Sigma_4^i[0:15]$ | $\Sigma_5^i[0:15]$ | $\Sigma_6^i[0:15]$ | $\Sigma_7^i[0:15]$ |
| $\Sigma_0^i[0:16]$ | $\Sigma_1^i[0:16]$ | $\Sigma_2^i[0:16]$ | $\Sigma_3^i[0:16]$ | $\Sigma_4^i[0:16]$ | $\Sigma_5^i[0:16]$ | $\Sigma_6^i[0:16]$ | $\Sigma_7^i[0:16]$ |
| $\Sigma_0^i[0:17]$ | $\Sigma_1^i[0:17]$ | $\Sigma_2^i[0:17]$ | $\Sigma_3^i[0:17]$ | $\Sigma_4^i[0:17]$ | $\Sigma_5^i[0:17]$ | $\Sigma_6^i[0:17]$ | $\Sigma_7^i[0:17]$ |
| $\Sigma_0^i[0:18]$ | $\Sigma_1^i[0:18]$ | $\Sigma_2^i[0:18]$ | $\Sigma_3^i[0:18]$ | $\Sigma_4^i[0:18]$ | $\Sigma_5^i[0:18]$ | $\Sigma_6^i[0:18]$ | $\Sigma_7^i[0:18]$ | replacement 156, diagram 156A, diagram 156B, diagram 156C, values 187A, and values 187B. Butterfly patterned replacements 152 includes replacements 154A, replacements 154B, and replacements 154C. With respect to FIG. 1B, butterfly patterned partial sums table 184A may correspond to butterfly patterned partial sums table 184 from FIG. 1A.

Accordingly, block 204 of process 200 proceeds by populating butterfly patterned partial sums table 184A from the corresponding "a" array for each full sized (W sized) block. In FIG. 1B, only one such block 186A is illustrated. Notice that for simplicity, it is assumed that there is no remnant and that block 186A corresponds to the first block, and thus the "a" array is accessed from the initial row. As shown in block 186A, access to the "a" array is organized in transposed form. Referring to Formula 1 above, the entries in block 186A can thus be seen to correspond to the $\theta \times \phi$ matrix products.

Butterfly Patterned Replacements

At block 206 of process 200, referring to FIG. 1A and FIG. 1B, GPU 170 applies X iterations of butterfly patterned replacements to each of the plurality of blocks in butterfly patterned partial sums table 184. As discussed above, in this particular example X is 3, since W=2^3=8. Thus, three iterations of replacements are applied, as shown in replacements 154A-154C in butterfly patterned replacements 152.

To understand why the partial sums table is described as "butterfly patterned", it is instructive to first observe an example replacement 156 operation on values 187A resulting in values 187B. As shown in FIG. 1B, replacement 156 or replace[i, j; k, l] operates on four different values at positions [i, k], [i, l], [j, k], and [j, l] (wherein the first index is the row and the second index is the column). As shown by values 187A, the initial values are position [i, j]=A, position [i, l]=B, position [j, k]=C, and position [j, l]=D. After applying replacement 156, the resulting values 187B are position [i, j]=A, position [i, l]=D, position [j, k]=A+B, and position [j, l]=C+D. While this particular replacement pattern appears to work best for GPU implementations, alternative embodiments can use variations on this replacement pattern. For example, the resulting values could instead be position [i, j]=A, position [i, l]=C, position [j, k]=A+B, and position [j, l]=C+D, with corresponding changes made in the binary search phase.

Diagram 156A illustrates a graphical version of replacement 156, wherein the horizontal axis spans columns, the vertical axis spans time, and the back to front axis spans rows. For example, one can visualize the top plane with points A, B, C, and D as corresponding to values 187A, the bottom plane with points A, D, A+B, and C+D as corresponding to values 187B, and the arrows as corresponding to the movement of values over time. If this three-dimensional representation is flattened into a front-to-back projection as in diagram 156B or a left side projection as in diagram 156C, it can be seen that a standard butterfly pattern emerges, thus explaining why the partial sums table is "butterfly patterned".

As shown in butterfly patterned replacements 152, replacement 156 is applied several times each iteration: 16 times for replacements 154A (iteration #1), 8 times for replacements 154B (iteration #2), and 4 times for replacements 154C (iteration #3). While the replacements within iterations can be carried out in parallel, the replacements of a successive iteration require the prior iteration to be completed in sequence. At each nth iteration, starting from row $2^{(n-1)}-1$, the replacement 156 operation is applied to each intersection of two rows whose indices differ by $2^{(n-1)}$ and two columns whose indices also differ by $2^{(n-1)}$. Thus, for the first iteration of replacements 154A every row from row 0 (rows 0-7) is affected, for the second iteration of replacements 154B every $2^{nd}$ row from row 1 (rows 1, 3, 5, and 7) is affected, and for the third iteration of replacements 154C every 4th row from row 3 (rows 3 and 7) is affected.

Replacement Iterations

Figure 1C:
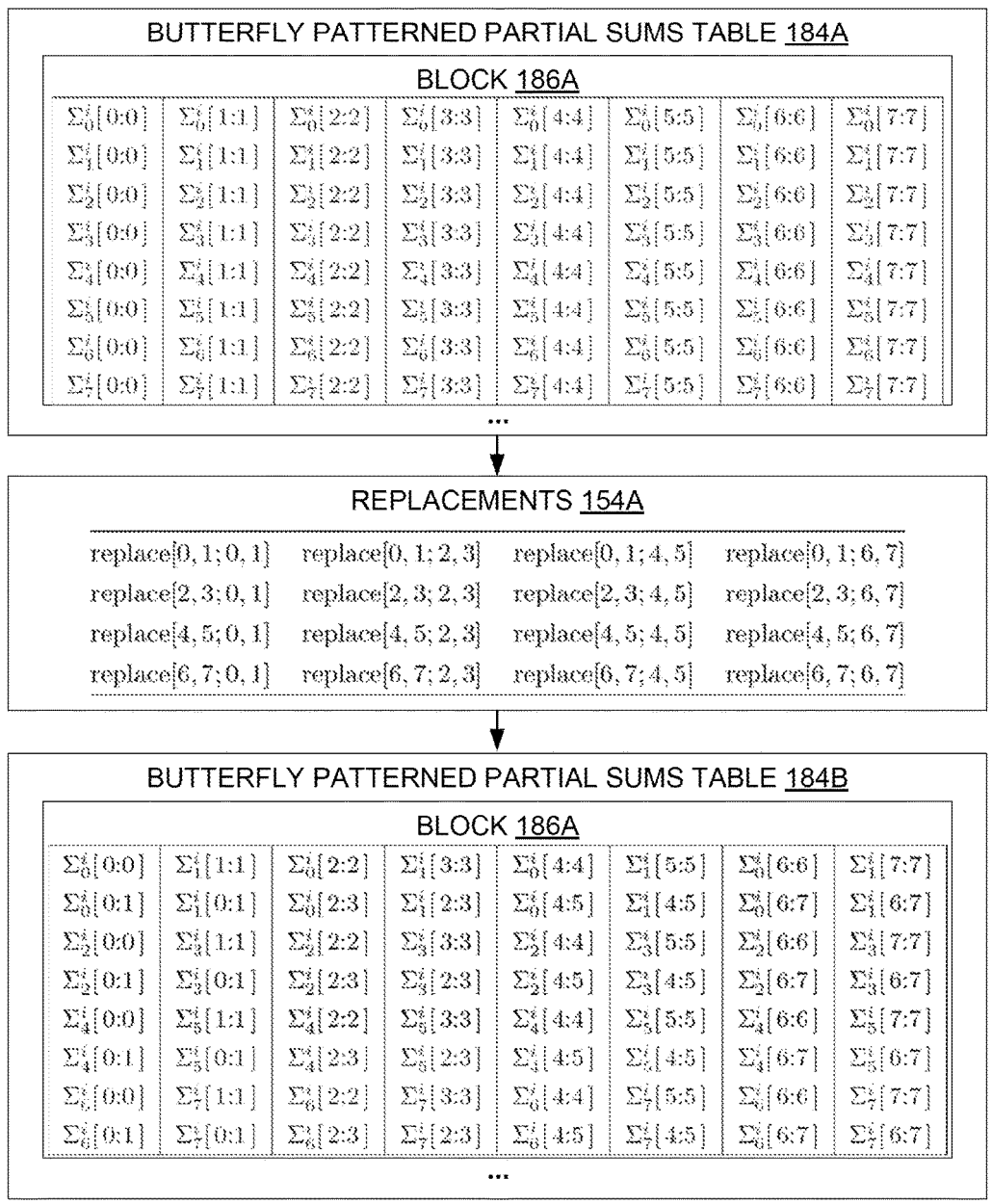
FIG. 1C, FIG. 1D and FIG. 1E are block diagrams that depict the steps of creating the butterfly patterned partial sums table of FIG. 1B, according to an embodiment.
Figure 1D:
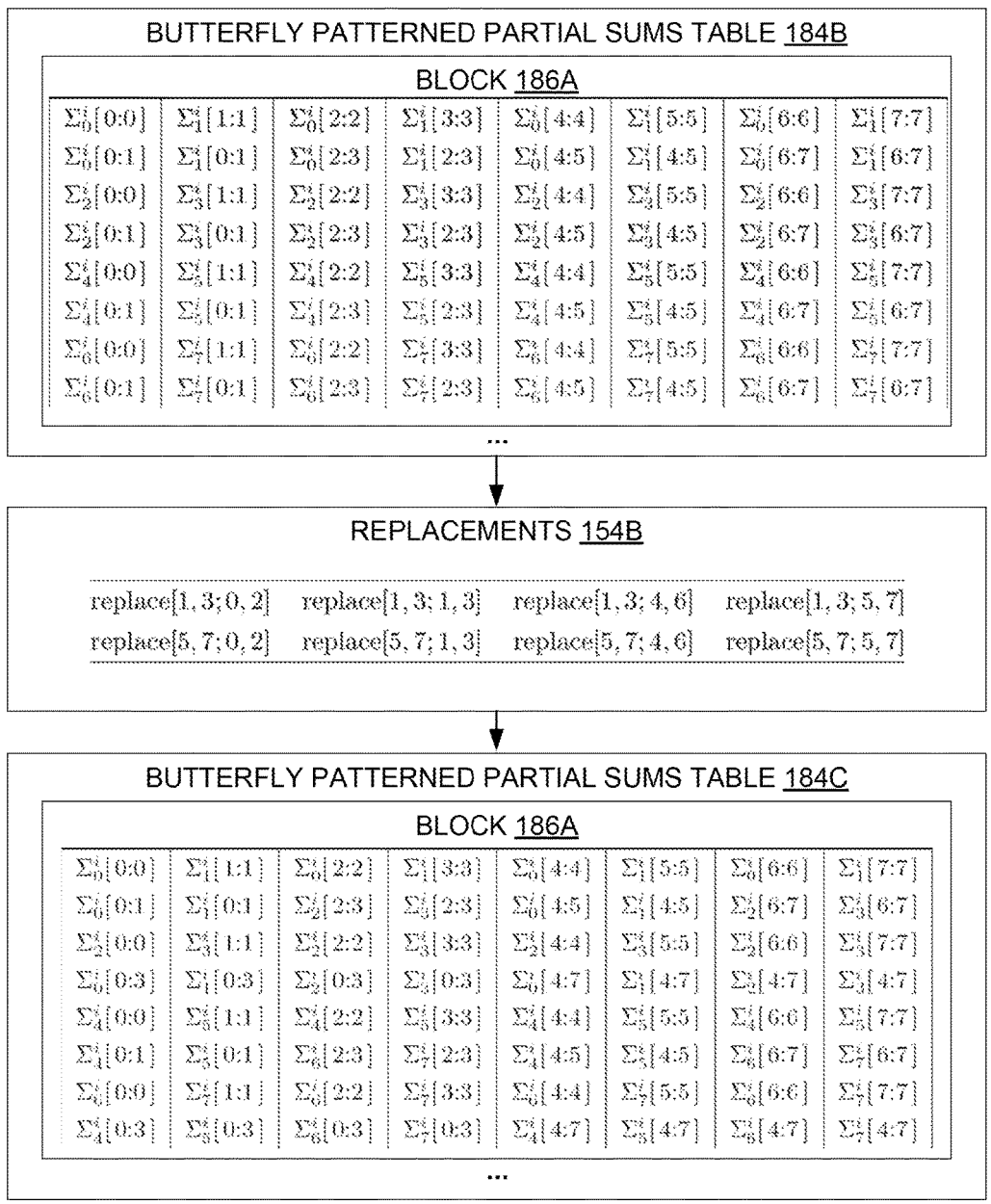
Figure 1E:
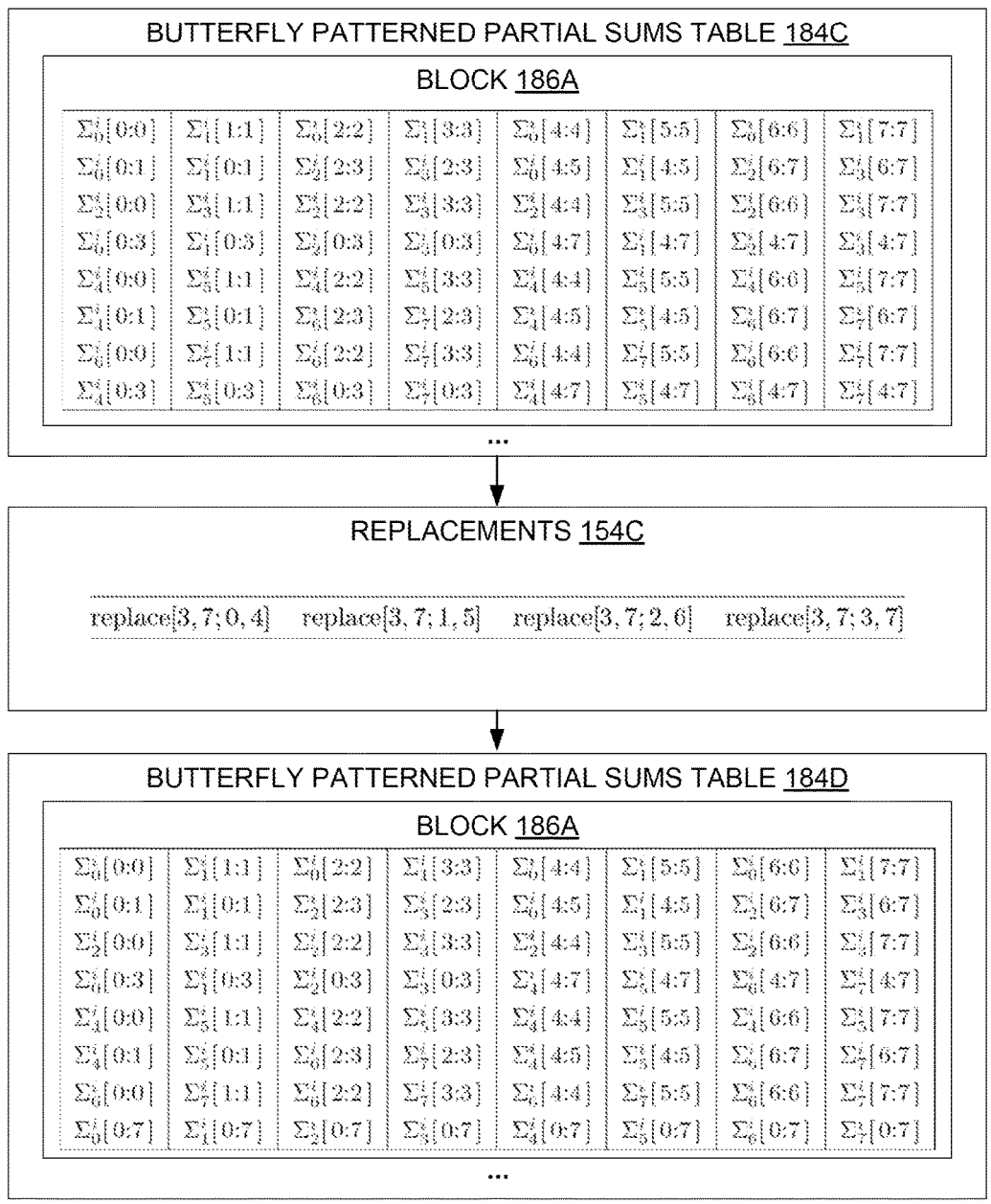

Referring to FIG. 1C-1E, FIG. 1C-1E are block diagrams that depict the steps of creating the butterfly patterned partial sums table 184A of FIG. 1B, according to an embodiment. The operations of replacements 154A, 154B, and 154C are illustrated respectively in FIG. 1C, FIG. 1D, and FIG. 1E.

Turning to FIG. 1C, FIG. 1C includes butterfly patterned partial sums table 184A, replacements 154A, and butterfly patterned partial sums table 184B. Butterfly patterned partial sums table 184A includes block 186A, and butterfly patterned partial sums table 184A includes block 186A. With respect to FIG. 1C, elements may correspond to like numbered elements from FIG. 1B.

As shown in FIG. 1C, after applying replacements 154A in the manner described above with respect to FIG. 1B, each full block of butterfly patterned partial sums table 184A is modified using replacements 154A to output butterfly patterned partial sums table 184B. As with FIG. 1B, while only a single block 186A is shown, the actual number of blocks will depend on the number of documents M that can be divided into full blocks with W elements or rows. Recall that since the remnant is processed by a sequential search, there is no need to process the remnant in the same manner as the full blocks, and thus the remnant can be ignored when applying the replacements.

For example, examining only the replace[0, 1; 0, 1] replacement, the first two rows and the first two columns in block 186A of butterfly patterned partial sums table 184A are processed using replacement 156 as described in FIG. 1B. For the replacements of A+B and C+D, it can be demonstrated that the sums simplify to the representations shown in block 186A of butterfly patterned partial sums table 184B with some simple algebra, which is omitted herein for brevity. The remaining 15 replacements in replacements 154A are carried out in a similar manner to result in butterfly patterned partial sums table 184B.

The process described in FIG. 1C is repeated in a similar manner for the remaining iterations of butterfly patterned replacements 152, wherein the output of each iteration is used as the input for the next iteration. Thus, referring to FIG. 1D, a second iteration applies replacements 154B to butterfly patterned partial sums table 184B to create butterfly patterned partial sums table 184C. Referring to FIG. 1E, a third iteration applies replacements 154C to butterfly patterned partial sums table 184C to create butterfly patterned partial sums table 184D. For brevity, a detailed discussion of the processing in FIG. 1D and FIG. 1E is omitted. After completing butterfly patterned replacements 152, butterfly patterned partial sums table 184D corresponds to a completed butterfly patterned partial sums table 184 in FIG. 1A, and thus block 206 is completed.

Butterfly Patterned Compared to Full Prefix Sums

While it may appear at first glance that the construction of the butterfly patterned partial sums table 184A by GPU 170 still requires a lot of computational work, this is actually not the case when compared to the traditional method of building a full prefix sums table. For example, as shown in FIG. 1B, the partial sums table already starts with optimal transposed access to the "a" array. From that point forward, the replacement operations only need to use existing data that is already in the block cached locally in the warp, which may be stored in high speed registers. Thus, high latency memory accesses can be minimized while performing butterfly patterned replacements 152, resulting in a large performance increase when compared to a full warp matrix transform and building a full prefix sums table. While this approach adds extra computational work to the binary search phase, this performance penalty is relatively insignificant due to the low number of butterfly patterned entries examined during the binary search phase.

Referring to butterfly patterned partial sums table 184D in FIG. 1E, after applying all of butterfly patterned replacements 152, the final result in the entry indexed at row "i", column "j" can be described as follows:

$$\Sigma_u^i[v:w]$$

Formula 2: Notation for Butterfly-Patterned Partial Sums Entries
wherein "~" indicates a bitwise negation (NOT) of a single argument,
wherein "&" indicates a bitwise conjunction (AND) of two arguments,
wherein "XOR" indicates a bitwise exclusive or (XOR) of two arguments,
wherein "floor" indicates a integer floor function,
and wherein:
m=i XOR (i+1)
k=floor (m/2)
u=(i & ~m)+(j & m)
v=j & (~k)
w=v+k Applying the butterfly patterned replacements based on the example parameters 182 discussed above in block 204 results in the following array "p":

patterned replacements of block 206 cause the last row in each block to be un-transposed. Thus, the last row assigns each partial sum to the thread that may potentially need the partial sum during the binary search phase. Accordingly, a first block level binary search can be conducted by all the threads in parallel by examining only the last row in each block. After a candidate block is found that may contain the desired search value, a second modified binary search is performed within the candidate block. Thus, the two-phase blocked binary search only imposes a slight performance penalty since the butterfly-patterned rows are only searched within a candidate block after the candidate block is identified from the first block level binary search. The second modified binary search is conducted based on Formula 2, as described above, to find the index for drawing an appropriate z value, as described further below.

Drawing Z Values in Parallel

At block 208 of process 200, referring to FIG. 1A, GPU 170 draws, in parallel from a plurality of discrete probability distributions as represented by parameters 182, z values 188, wherein the drawing performs a first binary search on the last row of the plurality of blocks in butterfly patterned partial sums table 184 to determine a candidate block and a second binary search within the candidate block to draw each of z values 188.

Each z value for a different discrete probability distribution can be drawn independently. Thus, the z values for each document in document corpus 160 can be drawn in parallel by a respective thread executing on GPU 170. While progress through a single discrete probability distribution, or the words of a document in "w", must be sequential, a high level of parallelism can still be provided when document corpus 160 contains enough documents to load the available threads of GPU 170.

To perform a parallel drawing of z values, each thread selects a random value from the real interval [0, 1). A "stop

TABLE 4

Example contents of a "p" array that includes butterfly-patterned partial sums.

| | | | | | | | |
|---|---|---|---|---|---|---|---|
| $\Sigma_0^i[0:0]$ | $\Sigma_1^i[0:0]$ | $\Sigma_2^i[0:0]$ | $\Sigma_3^i[0:0]$ | $\Sigma_4^i[0:0]$ | $\Sigma_5^i[0:0]$ | $\Sigma_6^i[0:0]$ | $\Sigma_7^i[0:0]$ |
| $\Sigma_0^i[0:1]$ | $\Sigma_1^i[0:1]$ | $\Sigma_2^i[0:1]$ | $\Sigma_3^i[0:1]$ | $\Sigma_4^i[0:1]$ | $\Sigma_5^i[0:1]$ | $\Sigma_6^i[0:1]$ | $\Sigma_7^i[0:1]$ |
| $\Sigma_0^i[0:2]$ | $\Sigma_1^i[0:2]$ | $\Sigma_2^i[0:2]$ | $\Sigma_3^i[0:2]$ | $\Sigma_4^i[0:2]$ | $\Sigma_5^i[0:2]$ | $\Sigma_6^i[0:2]$ | $\Sigma_7^i[0:2]$ |
| $\Sigma_0^i[3:3]$ | $\Sigma_1^i[4:4]$ | $\Sigma_0^i[5:5]$ | $\Sigma_1^i[6:6]$ | $\Sigma_0^i[7:7]$ | $\Sigma_1^i[8:8]$ | $\Sigma_0^i[9:9]$ | $\Sigma_1^i[10:10]$ |
| $\Sigma_0^i[3:4]$ | $\Sigma_1^i[3:4]$ | $\Sigma_2^i[5:6]$ | $\Sigma_3^i[5:6]$ | $\Sigma_0^i[7:8]$ | $\Sigma_1^i[7:8]$ | $\Sigma_2^i[9:10]$ | $\Sigma_3^i[9:10]$ |
| $\Sigma_2^i[3:3]$ | $\Sigma_3^i[4:4]$ | $\Sigma_2^i[5:5]$ | $\Sigma_3^i[6:6]$ | $\Sigma_2^i[7:7]$ | $\Sigma_3^i[8:8]$ | $\Sigma_2^i[9:9]$ | $\Sigma_3^i[10:10]$ |
| $\Sigma_0^i[3:6]$ | $\Sigma_1^i[3:6]$ | $\Sigma_2^i[3:6]$ | $\Sigma_3^i[3:6]$ | $\Sigma_4^i[7:10]$ | $\Sigma_5^i[7:10]$ | $\Sigma_6^i[7:10]$ | $\Sigma_7^i[7:10]$ |
| $\Sigma_4^i[3:3]$ | $\Sigma_5^i[4:4]$ | $\Sigma_4^i[5:5]$ | $\Sigma_5^i[6:6]$ | $\Sigma_4^i[7:7]$ | $\Sigma_5^i[8:8]$ | $\Sigma_4^i[9:9]$ | $\Sigma_5^i[10:10]$ |
| $\Sigma_4^i[3:4]$ | $\Sigma_5^i[3:4]$ | $\Sigma_6^i[5:6]$ | $\Sigma_7^i[5:6]$ | $\Sigma_4^i[7:8]$ | $\Sigma_5^i[7:8]$ | $\Sigma_6^i[9:10]$ | $\Sigma_7^i[9:10]$ |
| $\Sigma_6^i[3:3]$ | $\Sigma_7^i[4:4]$ | $\Sigma_6^i[5:5]$ | $\Sigma_7^i[6:6]$ | $\Sigma_6^i[7:7]$ | $\Sigma_7^i[8:8]$ | $\Sigma_6^i[9:9]$ | $\Sigma_7^i[10:10]$ |
| $\Sigma_0^i[0:10]$ | $\Sigma_1^i[0:10]$ | $\Sigma_2^i[0:10]$ | $\Sigma_3^i[0:10]$ | $\Sigma_4^i[0:10]$ | $\Sigma_5^i[0:10]$ | $\Sigma_6^i[0:10]$ | $\Sigma_7^i[0:10]$ |
| $\Sigma_0^i[11:11]$ | $\Sigma_1^i[12:12]$ | $\Sigma_0^i[13:13]$ | $\Sigma_1^i[14:14]$ | $\Sigma_0^i[15:15]$ | $\Sigma_1^i[16:16]$ | $\Sigma_0^i[17:17]$ | $\Sigma_1^i[18:18]$ |
| $\Sigma_0^i[11:12]$ | $\Sigma_1^i[11:12]$ | $\Sigma_2^i[13:14]$ | $\Sigma_3^i[13:14]$ | $\Sigma_0^i[15:16]$ | $\Sigma_1^i[15:16]$ | $\Sigma_2^i[17:18]$ | $\Sigma_3^i[17:18]$ |
| $\Sigma_2^i[11:11]$ | $\Sigma_3^i[12:12]$ | $\Sigma_2^i[13:13]$ | $\Sigma_3^i[14:14]$ | $\Sigma_2^i[15:15]$ | $\Sigma_3^i[16:16]$ | $\Sigma_2^i[17:17]$ | $\Sigma_3^i[18:18]$ |
| $\Sigma_0^i[11:14]$ | $\Sigma_1^i[11:14]$ | $\Sigma_2^i[11:14]$ | $\Sigma_3^i[11:14]$ | $\Sigma_4^i[15:18]$ | $\Sigma_5^i[15:18]$ | $\Sigma_6^i[15:18]$ | $\Sigma_7^i[15:18]$ |
| $\Sigma_4^i[11:11]$ | $\Sigma_5^i[12:12]$ | $\Sigma_4^i[13:13]$ | $\Sigma_5^i[14:14]$ | $\Sigma_4^i[15:15]$ | $\Sigma_5^i[16:16]$ | $\Sigma_4^i[17:17]$ | $\Sigma_5^i[18:18]$ |
| $\Sigma_4^i[11:12]$ | $\Sigma_5^i[11:12]$ | $\Sigma_6^i[13:14]$ | $\Sigma_7^i[13:14]$ | $\Sigma_4^i[15:16]$ | $\Sigma_5^i[15:16]$ | $\Sigma_6^i[17:18]$ | $\Sigma_7^i[17:18]$ |
| $\Sigma_6^i[11:11]$ | $\Sigma_7^i[12:12]$ | $\Sigma_6^i[13:13]$ | $\Sigma_7^i[14:14]$ | $\Sigma_6^i[15:15]$ | $\Sigma_7^i[16:16]$ | $\Sigma_6^i[17:17]$ | $\Sigma_7^i[18:18]$ |
| $\Sigma_0^i[0:18]$ | $\Sigma_1^i[0:18]$ | $\Sigma_2^i[0:18]$ | $\Sigma_3^i[0:18]$ | $\Sigma_4^i[0:18]$ | $\Sigma_5^i[0:18]$ | $\Sigma_6^i[0:18]$ | $\Sigma_7^i[0:18]$ |

Comparing Table 4 (butterfly-patterned) to Table 3 (traditional full prefix sums), a first observation is that the remnant is identical. Thus, a simple sequential search can readily proceed if the remnant needs to be searched (e.g. if the candidate block is the first full block). A second, more critical observation is that the last row of each full block is identical between the two tables. In effect, the butterfly-value" is calculated by scaling or multiplying this random value with the sum of all the θ×φ products (the relative probabilities), which corresponds to the last value in the "p" array. When a conventional full prefix sums table is available, then that full prefix sums table can be searched, for example by binary search, to find a smallest table index having a value exceeding the stop value. This smallest table index then becomes the z value to be returned. The binary search can be performed in parallel for each column in the prefix sums table.

However, since what is available is not the full prefix sums table but the special butterfly patterned partial sums table 184, the binary search phase is modified accordingly. As discussed above, butterfly patterned partial sums table 184 still retains the normal un-transposed prefix sum entries in the last row of each W sized block (having W rows or entries). Thus, a first binary search can be performed at the block level by only examining these last rows. Once a candidate block is identified, then a second binary search can be performed within the candidate block to identify the correct index to return as the z value. If the candidate block is the first block, then the remnant, if present, can also be searched if necessary to find the correct index, for example by sequential search.

To perform the second binary search, the "stop value" as described above is calculated while maintaining two additional state variables "lowValue" and "highValue". An invariant to be maintained is that if thread # "m" has indices "j" through "k" of a candidate block under consideration, then:

lowValue=$\Sigma_m^i$[0;blockBase+$j$−1]

highValue=$\Sigma_m^i$[0;blockBase+$k$]

wherein "blockBase" is the base index of the candidate block (that is, the index of its first row) in butterfly patterned partial sums table 184. To cut the search range in half for the binary search, the stop value is compared to the midpoint value:

$\Sigma_m^i$[0;blockBase+mid]

where mid=floor(($j$+$k$)/2).

If the full prefix sums table is available, this corresponds straightforwardly to an entry in the "p" array, or p[m, blockBase+mid]. The lowValue or highValue is updated to the midpoint value depending on this comparison, and another iteration of the binary search is performed, iterating until the correct index is found as the z value.

However, since what is available is the butterfly patterned partial sums table 184, the midpoint value is instead calculated on the fly by choosing an appropriate entry from the butterfly patterned "p" array (according to Formula 2 as described above) and either adding it to lowValue or subtracting it from highValue. On iteration "b" of the binary search (counting from 0), let bit=$2^{((\log_2 W)-1)-b}$. The value of "m" (the thread number) is ANDed with bit; if the result is 0, then the midpoint value is the appropriate entry added to lowValue. Otherwise, if the result is 1, then the midpoint value is the appropriate entry subtracted from highValue. The stop value is compared to the midpoint value and the invariant is maintained by updating either lowValue or highValue to the midpoint value. Additionally, a flip value (initialized to 0 at the start of the search) is updated, with flip=flip XOR (bit & m) if the result was 0, and with flip=flip XOR (bit & ~m) if the result was 1. Once the iterations of the binary search complete, the correct index corresponds to blockBase+(flip XOR m), which is returned as the z value.

However, there is also the possibility that the correct index is in the remnant, if present. In this case, a simple check can be made to see if the stop value is less than the last value in the final row of the remnant, and if so, to perform a simple sequential search within the remnant. Note that for purposes of thread synchronization, this check will be performed after all threads perform their respective binary searches through the full sized blocks. In this case, the z value is updated to the correct index within the remnant and returned as the z value.

Note that the above process for block 208 describes drawing a plurality of z values, but only one z value per discrete probability distribution or document in document corpus 160. Thus, block 208 may be repeated as necessary to continue drawing z values for the remaining words "w" of the documents in document corpus 160. Note that again for purposes of thread synchronization, threads that have already finished their respective documents may nevertheless continue to draw z values for the last "w" value, even though those specific threads do not need to calculate any further z values. This may be of special importance if GPU specific acceleration primitives are used, such as shuffle primitives that allow data communication between threads in a warp without accessing shared memory.

Once block 208 is repeated for all of the words in document corpus 160, the drawing of Z values 188 is completed. Of course, this is only one phase for parallel LDA Gibbs sampler 150, and repeated Z value samplings may also be required to obtain useful results. Nevertheless, by utilizing the above described butterfly patterned partial sums table rather than a traditional full prefix sums table, an approximate 2× performance increase has been observed for the entire operation of parallel LDA Gibbs sampler 150, and not just the Z sampling phase. Thus, significant performance benefits can be realized for various machine learning applications such as topic modeling for a large document corpus.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
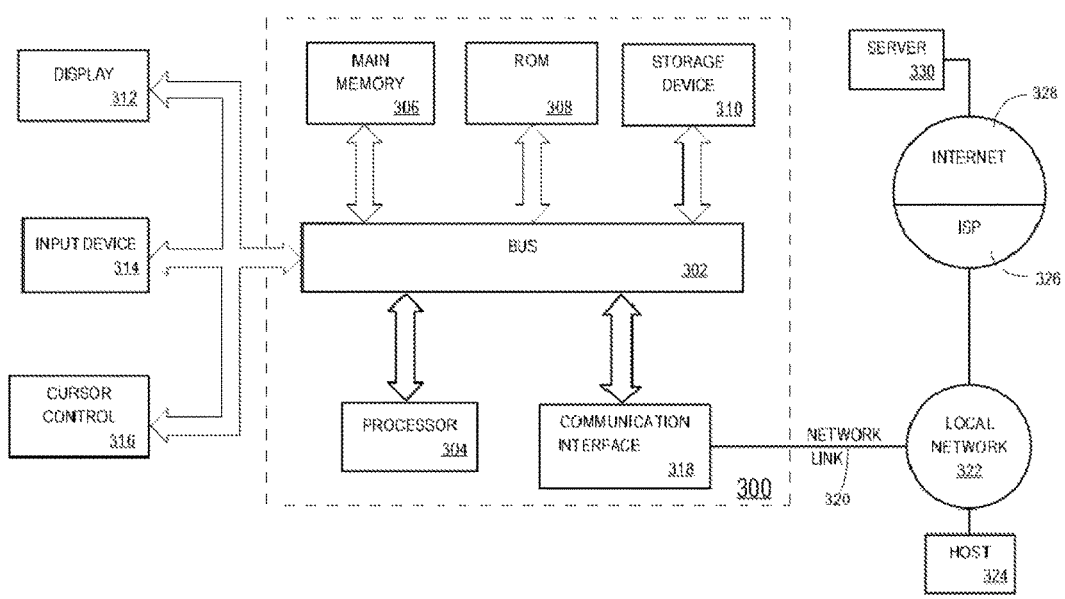
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for parallel random sampling from a plurality of discrete probability distributions by one or more multiprocessors, wherein the method comprises:

initializing a partial sums table based on a matrix product of parameters for the plurality of discrete probability distributions, wherein the partial sums table comprises a plurality of blocks, each of which has a maximum size W, which is a value that is based on a number of threads in a warp of at least one of the one or more multiprocessors;
applying one or more iterations of butterfly patterned replacements to each of the plurality of blocks such that a single row of each of the plurality of blocks is un-transposed; and
drawing, in parallel from each of the plurality of discrete probability distributions, at least one respective z value, wherein each parallel drawing performs, respectively:
a first binary search on the single un-transposed row of each of the plurality of blocks to determine a candidate block, and
a second binary search within the candidate block to draw the at least one respective z value;
wherein the method is performed by one or more computing devices.

2. The method of claim 1, wherein the parameters for the plurality of discrete probability distributions are received, in a transposed form, from one or more local memories that are local to one or more respective threads of a plurality of threads executing, concurrently, on the one or more multiprocessors.

3. The method of claim 1, wherein:
a plurality of z values is produced by said drawing, in parallel from each of the plurality of discrete probability distributions, at least one respective z value;
the one or more multiprocessors execute a plurality of threads concurrently; and
the parallel drawing of each of the plurality of z values executes on a respective thread of the plurality of threads.

4. The method of claim 1, wherein a graphics processing unit (GPU) includes at least one multiprocessor of the one or more multiprocessors.

5. The method of claim 1, wherein the parameters are retrieved in parallel, wherein the initializing of the partial sums table is in parallel, and wherein the applying of each of the one or more iterations of butterfly patterned replacements is in parallel.

6. The method of claim 1, wherein the plurality of discrete probability distributions are based on a plurality of documents in a documents corpus, wherein the parameters comprise a matrix "w" corresponding to words of the plurality of documents, a theta matrix ($\theta$) for "w", and a phi matrix ($\phi$) for "w".

7. The method of claim 1, wherein:
the one or more iterations of butterfly patterned replacements comprises X iterations; and
said W is 2 to the power of said X.

8. The method of claim 1, wherein the single row of each of the plurality of blocks is in the last position within each of the plurality of blocks.

9. One or more non-transitory computer-readable media storing one or more sequences of instructions which, when executed by one or more processors, cause parallel random sampling from a plurality of discrete probability distributions by one or more multiprocessors comprising:
initializing a partial sums table based on a matrix product of parameters for the plurality of discrete probability distributions, wherein the partial sums table comprises a plurality of blocks, each of which has a maximum size W, which is a value that is based on a number of threads in a warp of at least one of the one or more multiprocessors;
applying one or more iterations of butterfly patterned replacements to each of the plurality of blocks such that a single row of each of the plurality of blocks is un-transposed; and
drawing, in parallel from each of the plurality of discrete probability distributions, at least one respective z value, wherein each parallel drawing performs, respectively:
a first binary search on the single un-transposed row of each of the plurality of blocks to determine a candidate block, and
a second binary search within the candidate block to draw the at least one respective z value.

10. The one or more non-transitory computer-readable media of claim 9, wherein the parameters for the plurality of discrete probability distributions are received, in a transposed form, from one or more local memories that are local to one or more respective threads of a plurality of threads executing, concurrently, on the one or more multiprocessors.

11. The one or more non-transitory computer-readable media of claim 9, wherein:
a plurality of z values is produced by said drawing, in parallel from each of the plurality of discrete probability distributions, at least one respective z value;
the one or more multiprocessors execute a plurality of threads concurrently; and
the parallel drawing of each of the plurality of z values executes on a respective thread of the plurality of threads.

12. The one or more non-transitory computer-readable media of claim 9, wherein a graphics processing unit (GPU) includes at least one multiprocessor of the one or more multiprocessors.

13. The one or more non-transitory computer-readable media of claim 9, wherein the parameters are retrieved in parallel, wherein the initializing of the partial sums table is in parallel, and wherein the applying of each of the one or more iterations of butterfly patterned replacements is in parallel.

14. The one or more non-transitory computer-readable media of claim 9, wherein the plurality of discrete probability distributions are based on a plurality of documents in a documents corpus, wherein the parameters comprise a matrix "w" corresponding to words of the plurality of documents, a theta matrix ($\theta$) for "w", and a phi matrix ($\phi$) for "w".

15. The one or more non-transitory computer-readable media of claim 9, wherein:
the one or more iterations of butterfly patterned replacements comprises X iterations; and
said W is 2 to the power of said X.

16. The one or more non-transitory computer-readable media of claim 9, wherein the single row of each of the plurality of blocks is in the last position within each of the plurality of blocks.

17. A system comprising one or more multiprocessors configured to perform parallel random sampling from a plurality of discrete probability distributions by the one or more multiprocessors by being configured to:
initialize a partial sums table based on a matrix product of parameters for the plurality of discrete probability distributions, wherein the partial sums table comprises a plurality of blocks, each of which has a maximum size W, which is a value that is based on a number of threads in a warp of at least one of the one or more multiprocessors;

apply one or more iterations of butterfly patterned replacements to each of the plurality of blocks such that a single row of each of the plurality of blocks is un-transposed; and draw, in parallel from each of the plurality of discrete probability distributions, at least one respective z value, wherein each parallel draw performs, respectively:
 a first binary search on the single un-transposed row of each of the plurality of blocks to determine a candidate block, and
 a second binary search within the candidate block to draw the at least one respective z value.

18. The system of claim 17, wherein the one or more multiprocessors are further configured to receive the parameters, for the plurality of discrete probability distributions, in a transposed form from one or more local memories that are local to one or more respective threads of a plurality of threads executing, concurrently, on the one or more multiprocessors.

19. The system of claim 17, wherein:
 a plurality of z values is produced by drawing, in parallel from each of the plurality of discrete probability distributions, at least one respective z value;
 the one or more multiprocessors are configured to execute a plurality of threads concurrently; and
 the parallel draw of each of the plurality of z values executes on a respective thread of the plurality of threads.

20. The system of claim 17, wherein the one or more multiprocessors are further configured to retrieve the parameters in parallel, initialize the partial sums table in parallel, and apply each of the one or more iterations of butterfly patterned replacements in parallel.

21. The system of claim 17, wherein the plurality of discrete probability distributions are based on a plurality of documents in a documents corpus, wherein the parameters comprise a matrix "w" corresponding to words of the plurality of documents, a theta matrix ($\theta$) for "w", and a phi matrix ($\phi$) for "w".

22. The system of claim 17, further comprising a graphics processing unit (GPU) that includes at least one multiprocessor of the one or more multiprocessors.

23. The system of claim 17, wherein:
 the one or more iterations of butterfly patterned replacements comprises X iterations; and
 said W is 2 to the power of said X.

24. The system of claim 17, wherein the single row of each of the plurality of blocks is in the last position within each of the plurality of blocks.

* * * * *